US006100890A

United States Patent [19]

Bates et al.

[11] Patent Number: 6,100,890

[45] Date of Patent: Aug. 8, 2000

[54] AUTOMATIC BOOKMARKS

[75] Inventors: Cary Lee Bates, Rochester; Jeffrey Michael Ryan, Byron, both of Minn.

[73] Assignee: International Business Machines Corporation, Armonk, N.Y.

[21] Appl. No.: 08/978,126

[22] Filed: Nov. 25, 1997

[51] Int. Cl.[7] .......... G06F 3/00

[52] U.S. Cl. .......... 345/357; 345/356

[58] Field of Search .......... 345/326, 333, 345/339, 346, 347, 352, 353, 356, 357, 329, 335, 345; 707/501

[56] References Cited

U.S. PATENT DOCUMENTS 5,483,633 1/1996 Johnson .......... 345/357
5,727,129 3/1998 Barrett et al. .......... 345/353
5,845,290 12/1998 Yoshii .......... 345/333
5,854,630 12/1998 Nielsen .......... 345/352

OTHER PUBLICATIONS

Netscape browser screen, printed Sep. 25, 1997.

*Primary Examiner*—Raymond J. Bayerl
*Assistant Examiner*—Cad H. Nguyen
*Attorney, Agent, or Firm*—Owen J. Gamon

[57] ABSTRACT

A browser generates automatic bookmarks to browsed pages of information based on a selection criteria. The selection criteria can be based on a duration of time that a user browses the viewed page or based on matching words in the viewed page to keywords or to a synonym list for the keywords that the browser generates using a thesaurus. The browser also automatically catalogs the bookmark-list entries into folders based on matching words in the viewed page to the keywords and the synonym list.

30 Claims, 19 Drawing Sheets

AUTOMATIC BOOKMARKS

FIELD OF THE INVENTION

The present invention relates in general to improved information processing systems. More particularly, the present invention relates to a browser method and system for generating automatic bookmarks to browsed pages of information.

BACKGROUND

The development of computerized distributed information resources, such as the “Internet,” allows users to link to a computer network and retrieve vast amounts of electronic information previously unavailable in an electronic medium. Such electronic information increasingly is displacing more conventional means of information transmission, such as newspapers, magazines, and even television.

Electronic information transferred between computer networks (e.g., the Internet) can be presented to a user in hypertext, a metaphor for presenting information in a manner in which text, images, sounds, and actions are linked together in a complex, non-sequential web of associations that permits the user to “browse” through related topics, regardless of the presented order of the topics. For example, traveling among links to the word “iron” in an article displayed within a graphical user interface in a computer system might lead the user to the periodic table of the chemical elements, or to a reference to the use of iron in weapons in Europe in the Dark Ages. The term “hypertext” is used to describe documents, as presented by a computer, that express the nonlinear structure of ideas, as opposed to the linear format of books, film, and speech. The combination of hypertext documents connected by their links in the Internet is referred to as the World Wide Web (WWW).

Networked systems utilizing hypertext conventions typically follow a client/server architecture. A client is usually a computer that requests a service provided by another computer (i.e., a server). A server is typically a remote computer system accessible over a communications medium such as the Internet. Based upon such requests by the user at the client, the server presents information to the user as responses to the client. The client typically contains a program, called a browser, that communicates the requests to the server and formats the responses for viewing (browsing) at the client.

Servers typically contain “web pages” (also referred to simply as “pages”), which are data files, or documents, written in a hyper-text language that may have text, graphic images, and even multimedia objects, such as sound recordings or moving video clips, associated with that data file. The web page can be downloaded from the server by the client browser and displayed as a viewable object. The viewable object can contain one or more components, such as spreadsheets, text, hotlinks, pictures, sound, and video objects.

One key problem with browsing web pages is that it often becomes difficult for the user to return back to previously visited web pages of interest. Web pages have an address called a Uniform Resource Locator (URL), which is long and cumbersome for the user to remember or even write down. Some current browsers provide the feature of a sequential list of web pages that the user previously viewed. With such a feature, as the user visits various web pages, the browser typically records the URLs in the sequential list. The user can then select one of the pages from this list using the keyboard or a mouse. Unfortunately, simply having a list of the pages that have been previously viewed does not provide enough help for the user to find that one page that has a bit of interesting information since the number of pages browsed can be large.

Many current browsers have attempted to address this problem by providing a “bookmark” list. This bookmark list stores favorite URLs of the user’s choosing. When the user browses a page that the user would like to see again, the user can save the URL for that page in the bookmark list. In the future, when the user wishes to browse that page again, the user goes to the bookmark list and selects the page, which frees the user from needing to remember the URL. This feature forces the user to manually choose the web pages that are to be stored in the bookmark list. Also, since there is only one bookmark list, over time the list can grow very large, which again makes it difficult for the user to find the particular page of interest.

Another problem is that users often have more than one area of interest. For example, the user may start out looking for information on lawn tractors and in the process catch a case of spring-fever and start to look for information on bicycles, then go back to looking for lawn tractors, get bored and then start looking for fishing lures. There were then three different topics that the user investigated, but currently there is no aid to help users automatically organize these categories in the bookmark list.

From the foregoing, it can be seen that a need exists for a method and system for generating and cataloging automatic bookmark-list entries.

SUMMARY OF THE INVENTION

It is therefore one object of the present invention to provide for an improved browser method and system.

It is therefore another object of the present invention to provide an improved information processing system.

It is still another object of the present invention to provide to a method and system for generating automatic bookmarks to browsed pages of information.

It is still another object of the present invention to provide automatic cataloging of bookmarks into bookmark folders.

In the preferred embodiment, a browser generates automatic bookmarks to browsed pages of information based on a selection criteria. The selection criteria can be based on a duration of time that a user browses the viewed page or based on matching words in the viewed page to keywords or to a synonym list for the keywords that the browser generates using a thesaurus. The browser also automatically catalogs the bookmark-list entries into folders based on matching words in the viewed page to the keywords and the synonym list.

DESCRIPTION OF THE PREFERRED EMBODIMENT

Technology Overview

Figure 1:
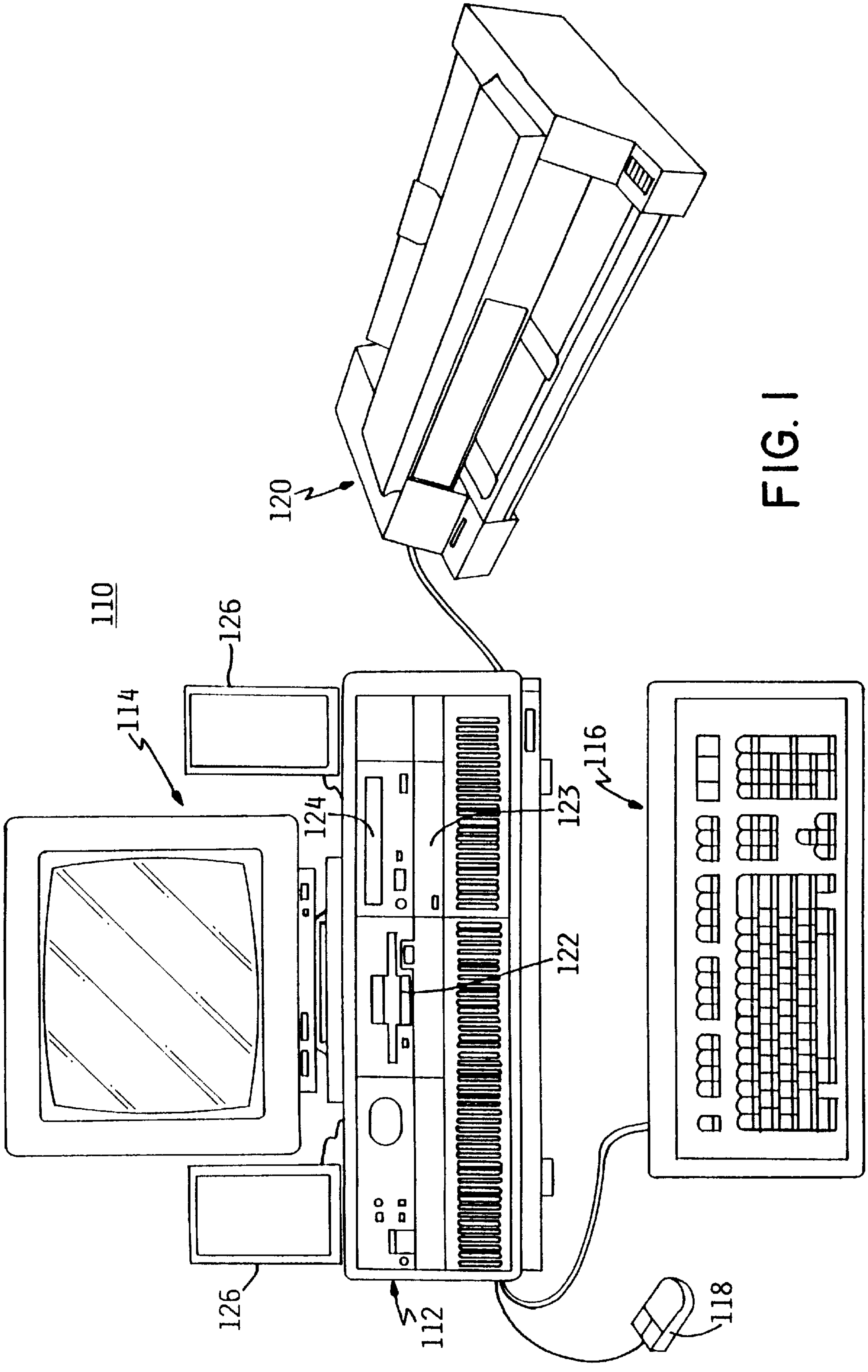
FIG. 1 illustrates a pictorial representation of a computer system that may be utilized to implement a preferred embodiment.

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Internet Protocol," a software protocol developed by the Department of Defense for facilitating communications between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information. For example, traveling among links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is used to describe documents, as presented by a computer, that express the nonlinear structure of ideas, as opposed to the linear format of books, film, and speech.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without needing to know any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources. Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server. A server can thus be described as a network computer that runs administrative software that controls access to all or part of the network and its resources, such as disk drivers or printers. A computer acting as a server makes resources available to computers acting as workstations on the network.

Client and server can communicate with one another utilizing the functionality provided by a hypertext transfer protocol (HTTP). The World Wide Web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname ("www.uspto.gov") of the server. The server name is associated with a unique numeric value (i.e., a TCP/IP address).

Active within the client is a first process, known as a "browser" that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page" or a "document") is a data file written in a hyper-text language, such as HTML, that may have text, graphic images, and even multimedia objects, such as sound recordings or moving video clips associated with that data file. The page contains control tags and data. The control tags identify the structure; for example, the headings, subheadings, paragraphs, lists, and embedding of images. The data consists of the contents, such as text or multimedia, that will be displayed or played to the user.

A browser interprets the control tags and formats the data according to the structure specified by the control tags to create a viewable object that the browser displays, plays, or otherwise performs to the user. A control tag may direct the browser to retrieve a page from another source and place it at the location specified by the control tag. In this way, the browser can build a viewable object that contains multiple components, such as spreadsheets, text, hotlinks, pictures, sound, and video objects.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger" than the physical size of the monitor screen, and devices such as graphical user interface scroll bars can be utilized by the viewing software (i.e., the browser) to view different portions of the web page.

As various "web sites" are visited via hypertext links displayed within a web browser, URLs representative of the web sites visited during a given web navigation session are typically recorded by the web browser. Because web sites tend to proliferate over time, a user searching for particular or important web sites can find it difficult to find those particular or important web sites. Navigating through existing web sites can be a time consuming task, and often important web sites are not visited. Many current browsers provide the user with a "bookmark" list. This bookmark list stores favorite URL's of the user. When the user browses a document that the user would like to browse again, the user can save the URL for that document in the bookmark list. In the future, when the user wishes to browse that document again, the user selects the document from the bookmark list, which frees the user from needing to remember the URL for the document.

Detailed Description

With reference now to the figures and in particular with reference to FIG. 1, there is depicted a pictorial illustration of a data-processing system that may be utilized to implement the preferred embodiment. Data-processing system 110 includes processing unit 112, display device 114, keyboard 116, pointing device 118, printer 120, and speakers 126. Although data-processing system 110 is illustrated with a mouse for pointing device 118, other graphical-pointing devices such as a graphic tablet, joystick, track ball, or track pad could also be utilized. Processing unit 112 receives input data from input devices such as keyboard 116, pointing device 118, and local area network interfaces (not illustrated) and presents output data to a user via display device 114, printer 120, and speakers 126. Pointing device 118 is preferably utilized in conjunction with a graphical user interface (GUI) in which hardware components and software objects are controlled through the selection and the manipulation of associated graphical objects displayed within display device 114.

To support storage and retrieval of data, processing unit 112 further includes diskette drive 122, hard-disk drive 123, and CD-ROM drive 124, which are interconnected with other components of processing unit 112. While a particular hardware configuration is described herein along with various alternatives, the methods described could in general be practiced using any hardware configuration that allows the browsing of information.

Figure 2:
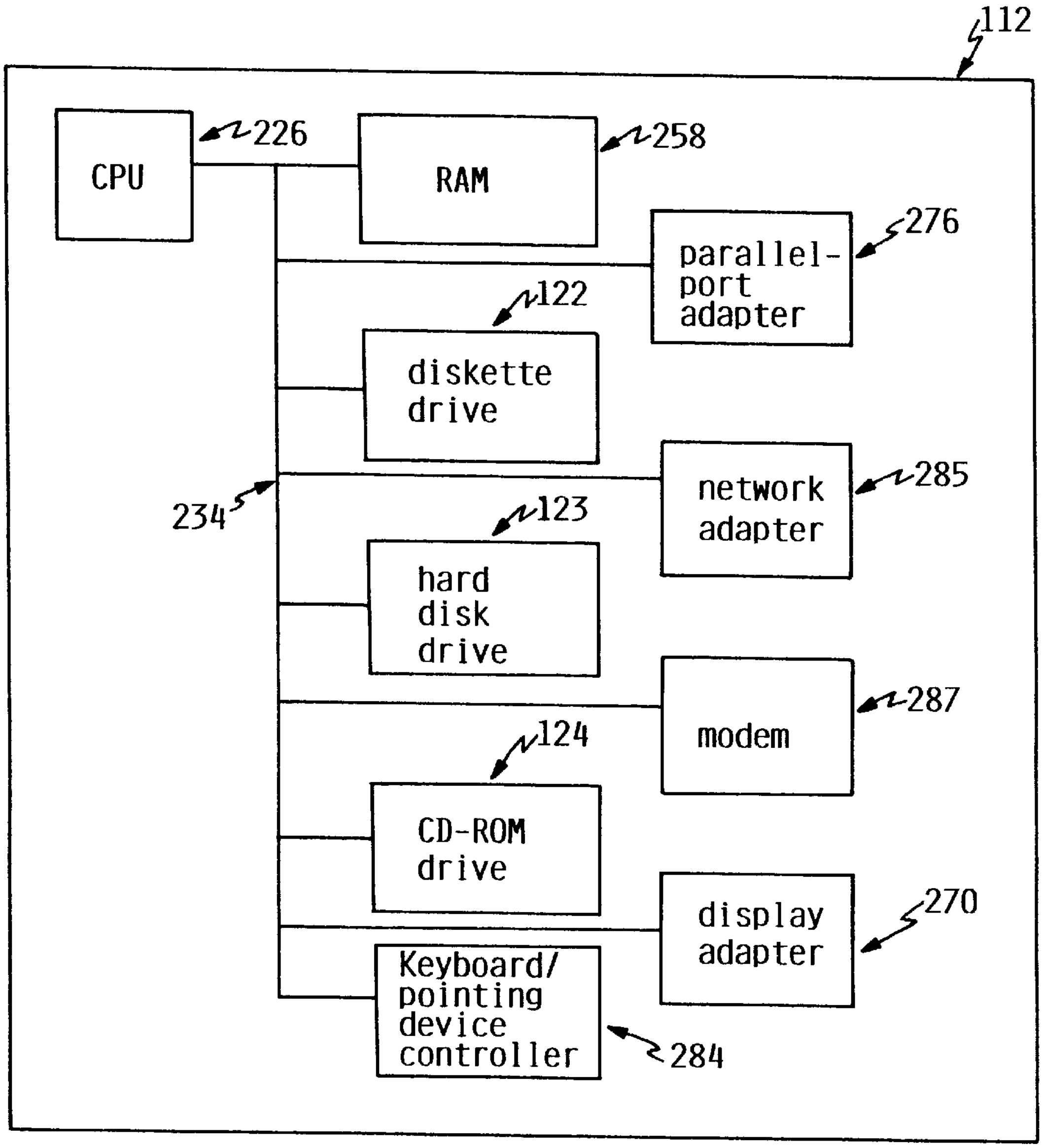
FIG. 2 illustrates a block diagram of a representative hardware environment of the processing unit of the computer system illustrated in FIG. 1.

Refining to FIG. 2, there is depicted a block diagram of the principal components of processing unit 112. CPU 226 is connected via system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 112 includes a central processing unit (CPU) 226, which executes instructions. While any appropriate processor can be utilized, CPU 226 is preferably one of the Power PC line of microprocessors available from IBM. Alternatively, CPU 226 can be implemented as one of the 80×86 or Pentium processors, or any other type of processor, which are available from a number of vendors. CPU 226 accesses data and instructions from and stores data to volatile RAM 258.

RAM 258 comprises a number of individual, volatile-memory modules that store segments of operating systems and application software while power is supplied to data-processing system 110. The software segments are partitioned into one or more virtual-memory pages, which each contain a uniform number of virtual memory addresses. When the execution of software requires more pages of virtual memory than can be stored within RAM 258, pages that are not currently needed are swapped with the required pages, which are stored within non-volatile storage devices 122 or 123.

Keyboard/pointing-device controller 284 interfaces processing unit 112 with keyboard 116 and graphical-pointing device 118. In an alternative embodiment, there could be a separate controller for keyboard 116 and graphical-pointing device 118.

Display adapter 270 translates graphics data from CPU 226 into video signals utilized to drive display device 114.

Finally, processing unit 112 includes network-adapter 285, modem 287, and parallel-port adapter 276, which facilitate communication between data-processing system 110 and peripheral devices or other data processing systems. Network-adapter 285 connects data-processing system 110 to an unillustrated local-area-network (LAN). A LAN provides a user of data-processing system 110 with a means of electronically communicating information, including software, with a remote computer or a network logical-storage device. In addition, a LAN supports distributed processing, which enables data-processing system 110 to share a task with other data-processing systems linked to the LAN.

Modem 287 supports communication between data-processing system 110 and another data-processing system over a standard telephone line. For example, modem 287 may be utilized to connect data-processing system 110 to an on-line information service, such as provided by Prodigy Services Corporation under the service mark "PRODIGY." Such an on-line service provides software that can be downloaded into data-processing system 110 via modem 287. Furthermore, through modem 287, data-processing system 110 can access other systems such as a server, a client, an electronic bulletin board, and the Internet or World Wide Web.

Parallel-port adapter 276 transmits printer-control signals to printer 120 through a parallel port.

As will be described in detail below, aspects of the preferred embodiment pertain to specific method steps implementable on computer systems. In an alternative embodiment, the invention may be implemented as a computer program-product for use with a computer system. The programs defining the functions of the present invention can be delivered to a computer via a variety of signal-bearing media, which include, but are not limited to, (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the method functions of the present invention, represent alternative embodiments of the present invention.

Figure 3:
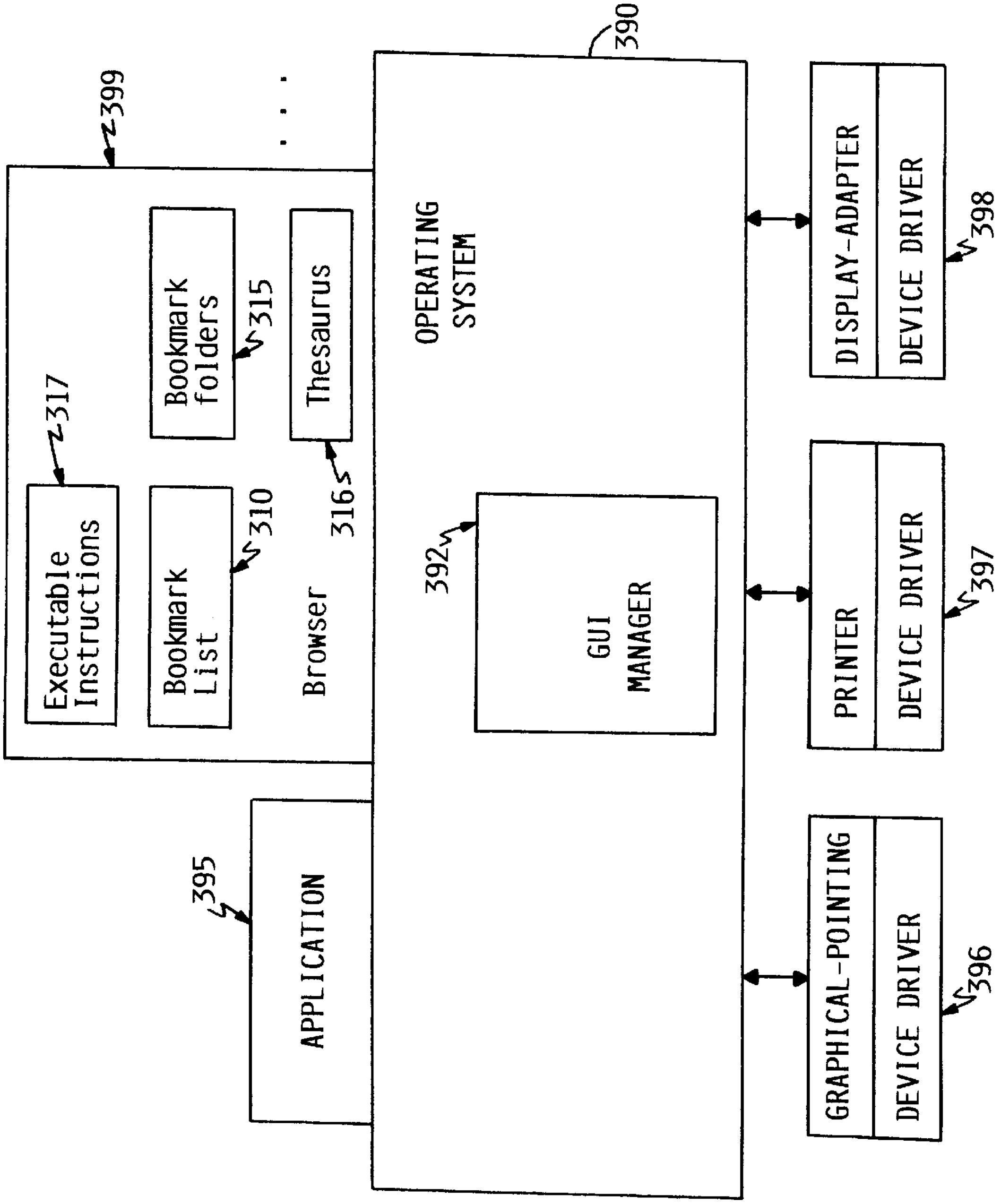
FIG. 3 illustrates a block diagram representation of software stored within the memory of the computer system depicted in FIG. 1.

With reference now to FIG. 3, there is illustrated a block-diagram representation of the software configuration of data-processing system 110 in accordance with the preferred embodiment. As noted above, the software executed by data-processing system 110 can be stored within one or more of RAM 258, the nonvolatile storage provided by diskette drive 122, hard-disk drive 123, CD-ROM drive 124, or a remote server accessible via modem 287 or network-adapter 285.

As illustrated, the software configuration of data-processing system 110 includes operating system 390, which is responsible for directing the operation of data-processing system 110. For example, operating systems typically include computer software for controlling the allocation and usage of hardware resources such as memory, CPU time, disk space, and peripheral devices. A suitable operating system 390 and associated graphical-user-interface manager 392 (e.g., Microsoft Windows, AIX, or OS/2) could be used. Other technologies also could be utilized, such as touch-screen technology or human-voice control. The operating system is the foundation upon which applications 395, such word-processing, spreadsheet, and web browser programs are built. One such application is web browser 399.

In accordance with the preferred embodiment, operating system 390 includes graphical-user-interface (GUI) 392 manager although they could be packaged separately. GUI 392 manages the graphical-user-interface with which a user of data-processing system 110 interacts.

Operating system 390 communicates with applications 395 and browser 399 through messages conforming to the syntax of the application-program-interface (API) supported by operating system 390. Operating system 390 further communicates with graphical-pointing device-driver 396, printer device-driver 397, and display-adapter device-driver 398. For example, operating system 390 sends graphics data to display-adapter device-driver 398, which in turn translates the messages into bus signals utilized to control display-adapter 270. In addition, graphical-pointing device-driver 396 translates signals from pointing device 118 through keyboard/pointing-device controller 284 into Cartesian coordinates and a selection status, which are then relayed to GUI manager 392. Finally, operating system 390 sends print data to printer device-driver 397, which in turn translates the print data into bus signals utilized to drive printer 120.

Browser 399 includes bookmark list 310, bookmark-folder list 315, thesaurus 316, and executable instructions 317, which are further described under the description for FIG. 10, below. In an alternative embodiment, bookmark list 310, bookmark-folder list 315, and thesaurus 316 could be packaged separately from browser 399. Although browser 399 is drawn as being separate from operating system 390, they could be packaged together. CPU 226 is suitably programmed to carry out the preferred embodiment by executable instructions 317 in browser 399, as described in more detail in the flowcharts of FIGS. 11–14. In the alternative, the function of FIGS. 11–14 could be implemented by control circuitry through the use of logic gates, programmable-logic devices, or other hardware components in lieu of a processor-based system.

Figure 4:
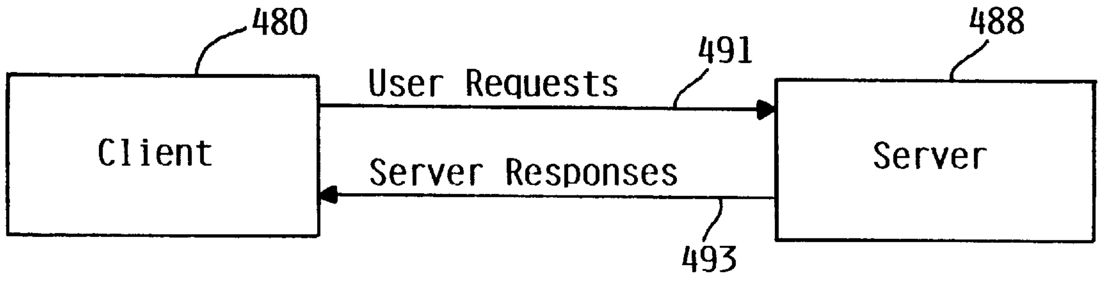
FIG. 4 illustrates a block diagram illustrative of a client/server architecture in accordance with a preferred embodiment.

FIG. 4 depicts a block diagram illustrative of a client/server architecture, in accordance with a preferred embodiment. User requests 491 are sent by client process 480 to server process 488. Server process 488 can be active in a remote computer system accessible over a computerized, distributed-information resource such as the Internet or other communications network. Server process 488 performs scanning and searching of information sources (e.g., newswire feeds or newsgroups) and, based upon these user requests, presents the filtered electronic information as server responses 493 to client process 480. Client process 480 may be active in a first computer system, and server process 488 may be active in a second computer system, communicating with one another over a communications medium, thus providing distributed functionality and allowing multiple clients to take advantage of the information-gathering capabilities of the server.

Figure 5:
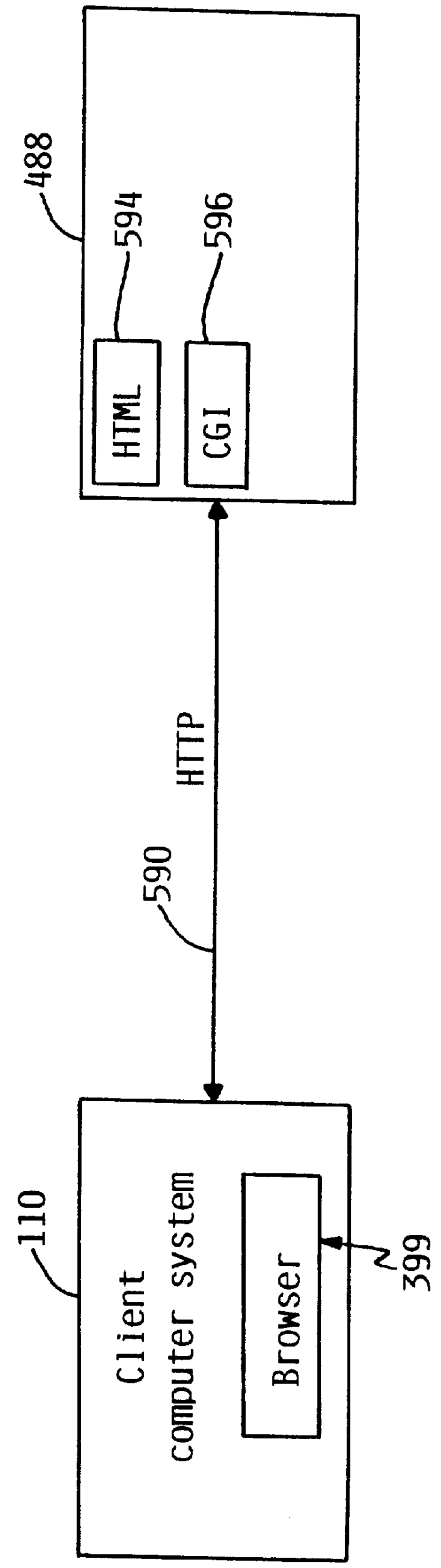
FIG. 5 depicts a detailed block diagram of a client/server architecture in accordance with a preferred embodiment.

FIG. 5 illustrates a detailed block diagram of a client/server architecture in accordance with a preferred embodiment. Although the client and server are processes that are operative within two computer systems, these processes being generated from a high-level programming language (e.g., PERL), which is interpreted and executed in a computer system at runtime (e.g., a workstation), they could be implemented in a variety of hardware devices, either programmed or dedicated.

Computer system 110, functioning as a client, and server 488 communicate by utilizing the functionality provided by HTTP. Active within computer system 110 is a first client process, browser 399, which establishes connections with server 488 and presents information to the user.

Server 488 executes the corresponding server software, which presents information to the client in the form of HTTP responses 590. The HTTP responses 590 correspond with the web pages represented using HTML or other data generated by server 488. Server 488 provides HTML 594. Server 488 also provides Common Gateway Interface (CGI) 596, which allows client computer system 110 to direct server 488 to commence execution of a specified program contained within server 488. This may include, for example, a search engine that scans received information in the server for presentation to the user controlling the client. Using this interface and HTTP responses 590, the server may notify the client of the results of that execution upon completion. Although the specific protocols of HTTP, HTML, and CGI are shown, any suitable protocols could be used.

Figure 6:
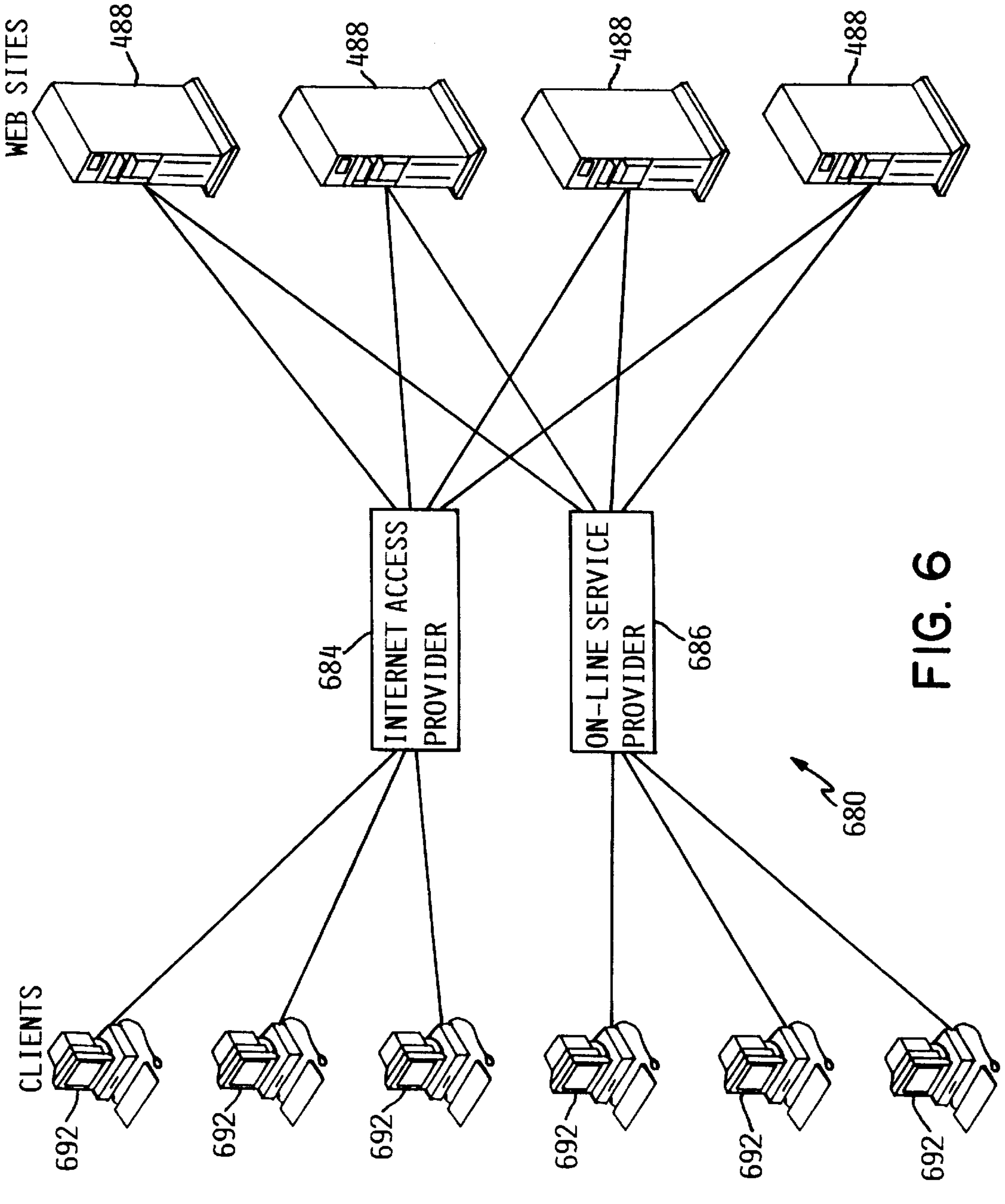
FIG. 6 depicts a pictorial illustration of a computer network that can be implemented in accordance with a preferred embodiment.

FIG. 6 is a diagram illustrative of a computer network 680, which can be implemented in accordance with the preferred embodiment. Computer network 680 is representative of the Internet, which can be described as a known computer network based on the client-server model discussed herein. Conceptually, the Internet includes a large network of servers 488 that are accessible by clients 692, typically users of personal computers, through some private Internet access provider 684 (e.g., Internet America) or an on-line service provider 686 (e.g., America On-Line, Prodigy, and Compuserve). Each of clients 692 may run browser 399 to access servers 488 via the access providers. Each server 488 operates a web site that supports files in the form of documents and pages. Network paths to servers 488 are identified by a Universal Resource Locator (URL) having a known syntax for defining a network connection.

Figure 7:
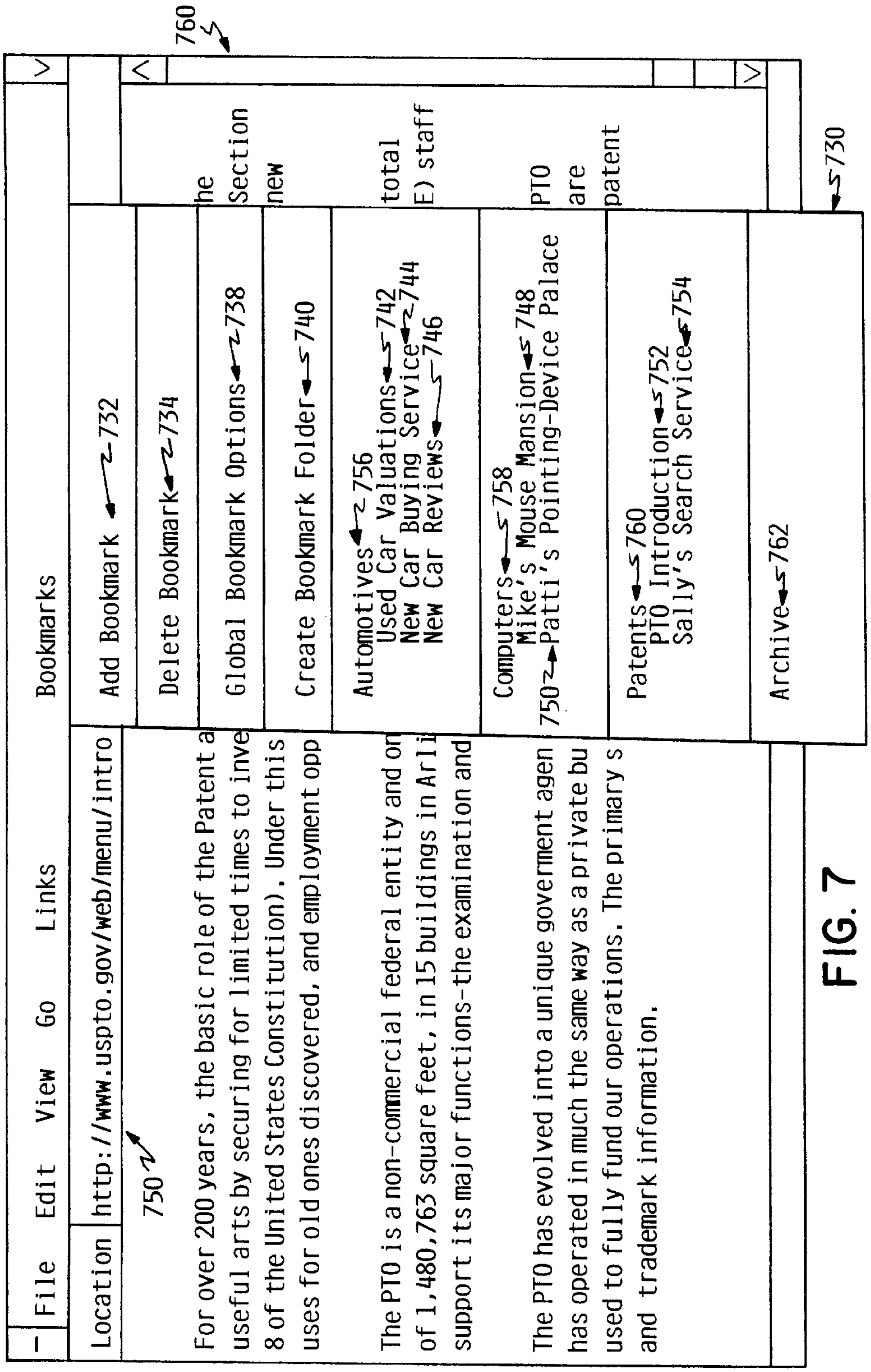
FIG. 7 illustrates a pictorial representation of the interfaces that are used to control the operation of the preferred embodiment.

FIG. 7 illustrates a pictorial representation of the interfaces presented by browser 399 on display 114 that are used to control the operations of the preferred embodiment. Bookmark control 730 is a pull-down menu, which the user can access to control the operations of the preferred embodiment. Bookmark control 730 contains bookmark control options "Add Bookmark" 732, "Delete Bookmark" 734, "Global Bookmark Options" 738, and "Create Bookmark-Folder" 740, plus bookmark names "Used Car Valuations" 742, "New Car Buying Service" 744, "New Car Reviews" 746, "Mike's Mouse Mansion 748", "Patti's Pointing-Device Palace" 750, "PTO Introduction" 752, and "Sally's Search Service" 754. Bookmark names 742, 744, and 746 are organized into "Automobiles" folder 756; bookmark names 748 and 750 are organized into "Computers" folder 758; and bookmark names 752 and 754 are organized into "Patents" folder 760. Bookmark control 730 also contains "archive" folder 762, which does not have any bookmarks displayed. Bookmarks are only displayed in bookmark control 730 when the user selects their associated folder.

When the user selects a bookmark name from bookmark control 730, browser 399 will access the page associated with the bookmark name as described below under the description for FIGS. 11 and 13. In this example, the user has previously selected bookmark name 752, which caused browser 399 to display example page 760 from URL 750, which is the address "http://www.uspto.gov/web/menu/intro.html".

When the user selects "Add Bookmark" 732, browser 399 adds the current viewed page to bookmark list 310 as further described below under the description for FIGS. 11 and 14.

When the user selects "Delete Bookmark" 734, browser 399 removes the bookmark name associated with the displayed page from bookmark list 310.

Figure 9A:
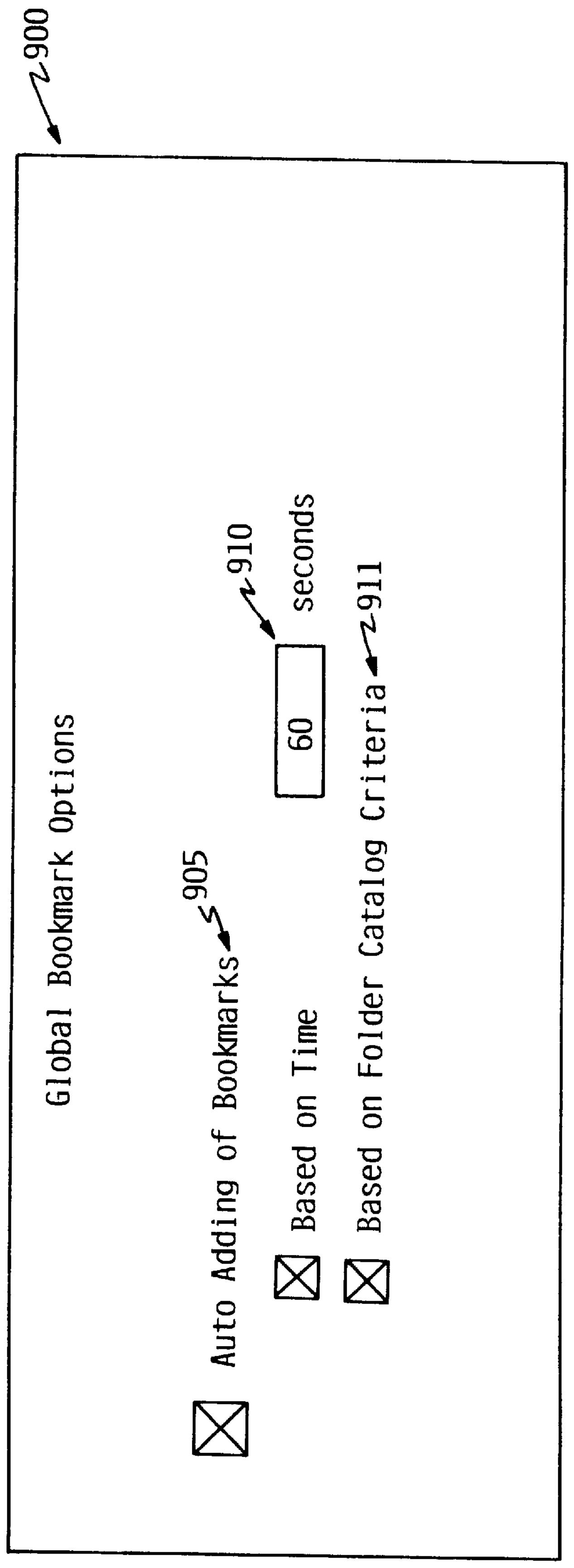
FIG. 9*a* is a pictorial representation of the global bookmark-options dialog used to control the operation of the preferred embodiment.

When the user selects "Global Bookmark-Options" 738, browser 399 displays the example dialog shown in FIG. 9*a* and saves the values input by the user. These input values are used by browser 399 as described below under the description for FIG. 13.

When the user selects create bookmark-folder 740, browser 399 displays the example dialog shown in FIG. 8 and performs the processing as described in the description for FIGS. 11 and 12, below.

Figure 8:
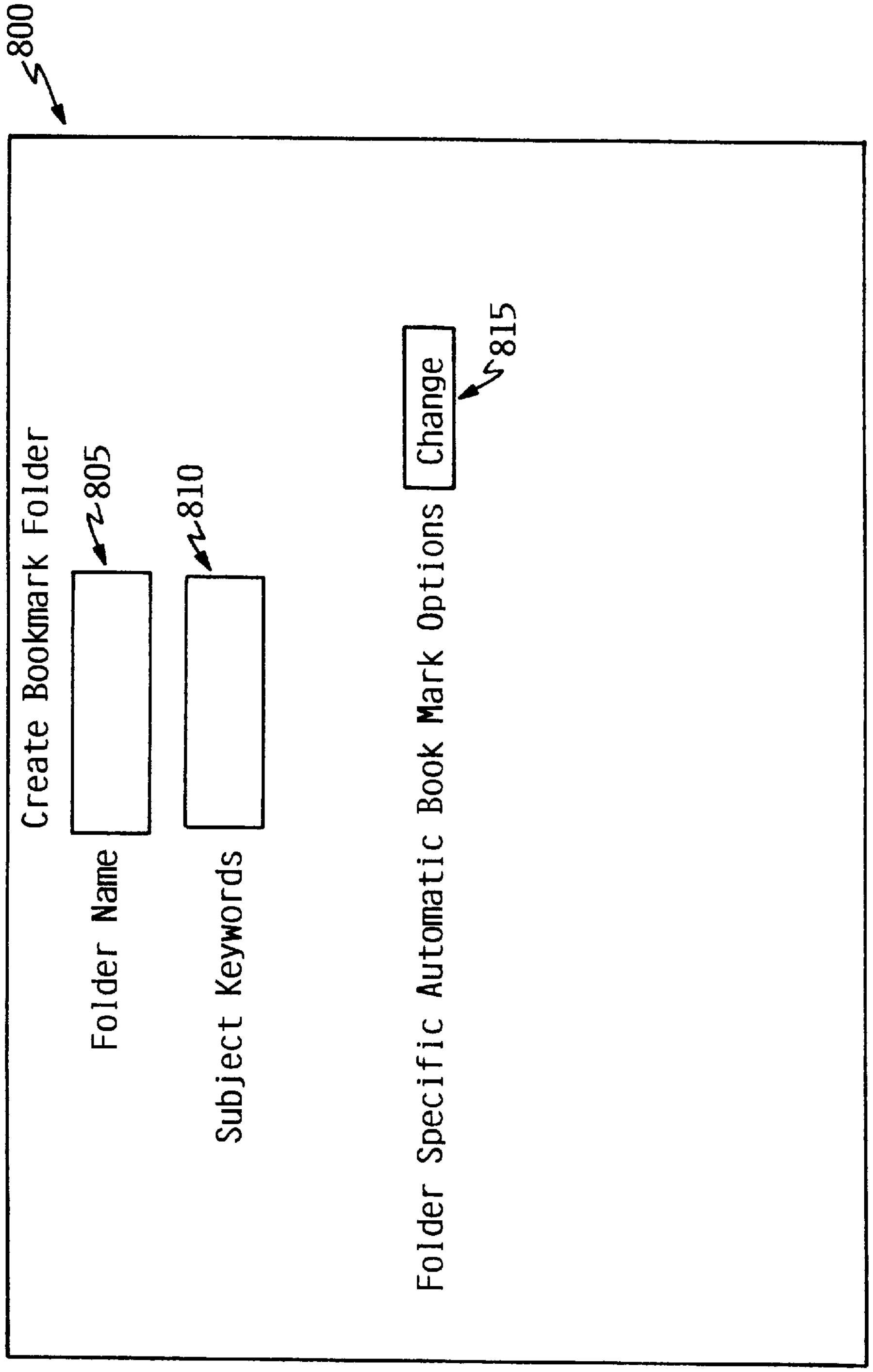
FIG. 8 is a pictorial representation of the create bookmark-folder dialog used to control operation of the preferred embodiment.

Referring to FIG. 8, there is illustrated a pictorial representation of Create Bookmark Folder dialog 800, which is displayed on display 114 by browser 399 in response to the user selecting create bookmark-folder 740, as described above in FIG. 7. Referring again to FIG. 8, browser 399 has displayed folder name 805, subject keywords 810, and folder-specific automatic bookmark-options 815. Folder name 805 is an input field, in which the user may enter the name of the folder for browser 399 to create in bookmark-folder list 315. Subject keywords 810 is an input field, in which the user may input words that browser 399 will subsequently use as criteria for selecting pages for inclusion in the bookmark folder specified in folder name 805, as further described below under the description for FIGS. 12, 13, and 14. Referring again to FIG. 8, when the user selects folder-specific automatic bookmark-options 815, browser 399 presents the dialog shown in FIG. 9*b*, described below.

Referring to FIG. 9*a*, there is illustrated a pictorial representation of Global Bookmark-Options dialog 900 used to control the operation of the preferred embodiment. Browser 399 displays dialog 900 on display 114 when the user selects Global Bookmark-Options 738, as described above under the description for FIG. 7. Referring again to FIG. 9*a*, the user may designate automatic bookmark-adding selection-criteria based on time 910 or based on folder catalog-criteria 911. The options that the user selects in dialog 900 apply globally to all folders. The processing that browser 399 performs in response to the user selecting based-on-time 910 is further described below, under the description for FIG. 13.

Referring again to FIG. 9*a*, the processing that browser 399 performs in response to the user selecting auto-adding of bookmarks based-on-folder catalog-criteria 911 is further described below, under the description for FIG. 13.

Figure 9B:
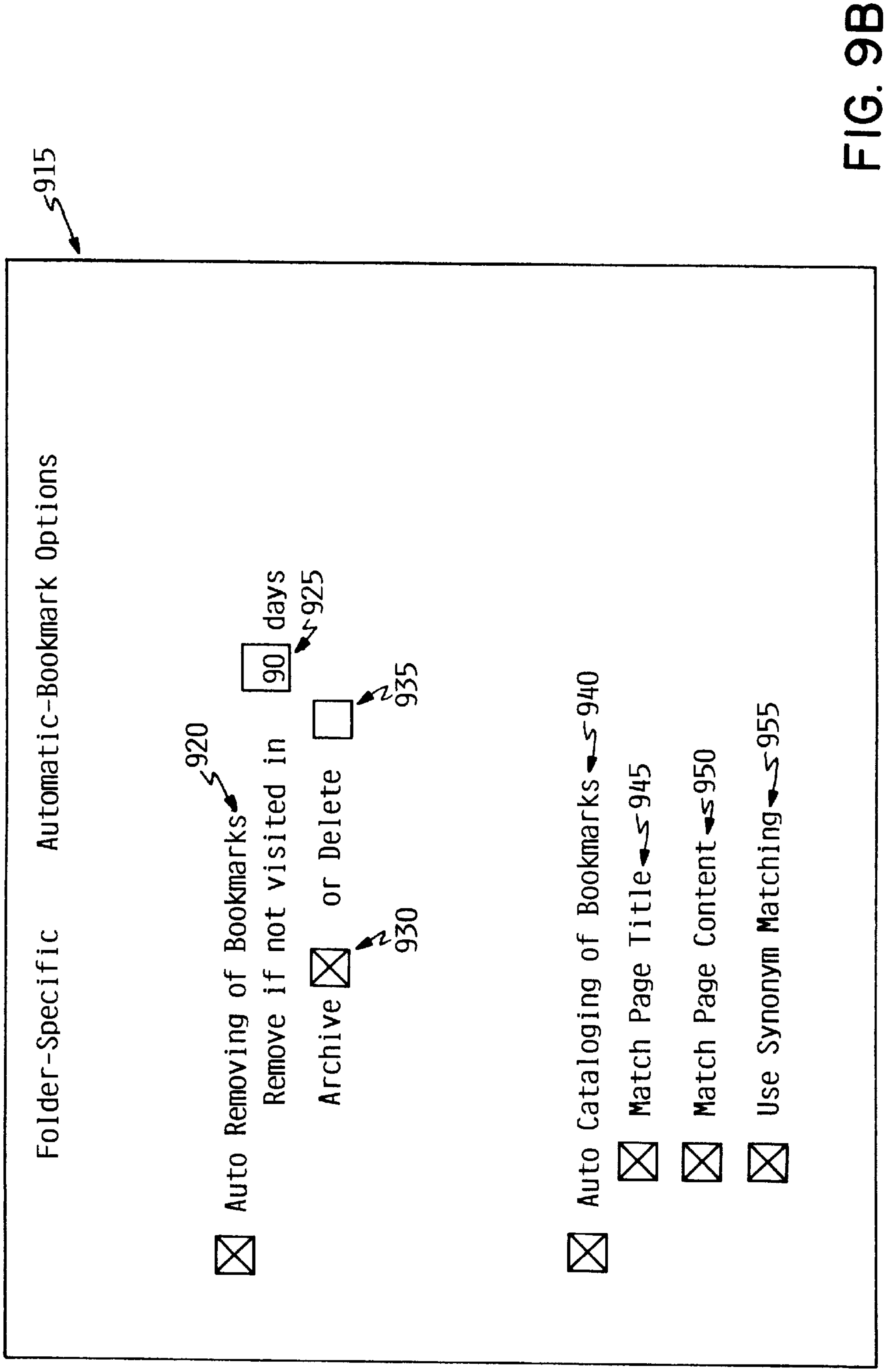
FIG. 9*b* is a pictorial representation of the folder-specific automatic-bookmark options dialog used to control the operation of the preferred embodiment.

Referring to FIG. 9*b*, there is illustrated a pictorial representation of Folder-Specific Automatic-Bookmark-Options dialog 915 used to control the operation of the preferred embodiment. Browser 399 displays dialog 915 on display 114 when the user selects change button 815 in Create Bookmark-Folder dialog 800, as described above under the description for FIG. 8. Referring again to FIG. 9*b*, the user may select auto removing of bookmarks 920 based-on-time 925 and may also select that the bookmarks be archived 930 or deleted 935. The user may select auto cataloging of bookmarks 940 based on matching the page title 945, matching the page content 950, or matching based on synonyms 955. The processing for the auto removing of bookmarks is described under the description for FIG. 13, below. The processing for the auto cataloging of bookmarks is described under the description for FIG. 14, below.

Auto-adding of bookmarks 905 in FIG. 9*a* controls the decision-making process of determining automatically to add a bookmark to the bookmark list; in contrast, auto-cataloging of bookmarks 940 in FIG. 9*b* controls the decision-making process of determining which folder to put the bookmark in once the decision to add the URL to bookmark list 310 has already been made.

Figure 10A:
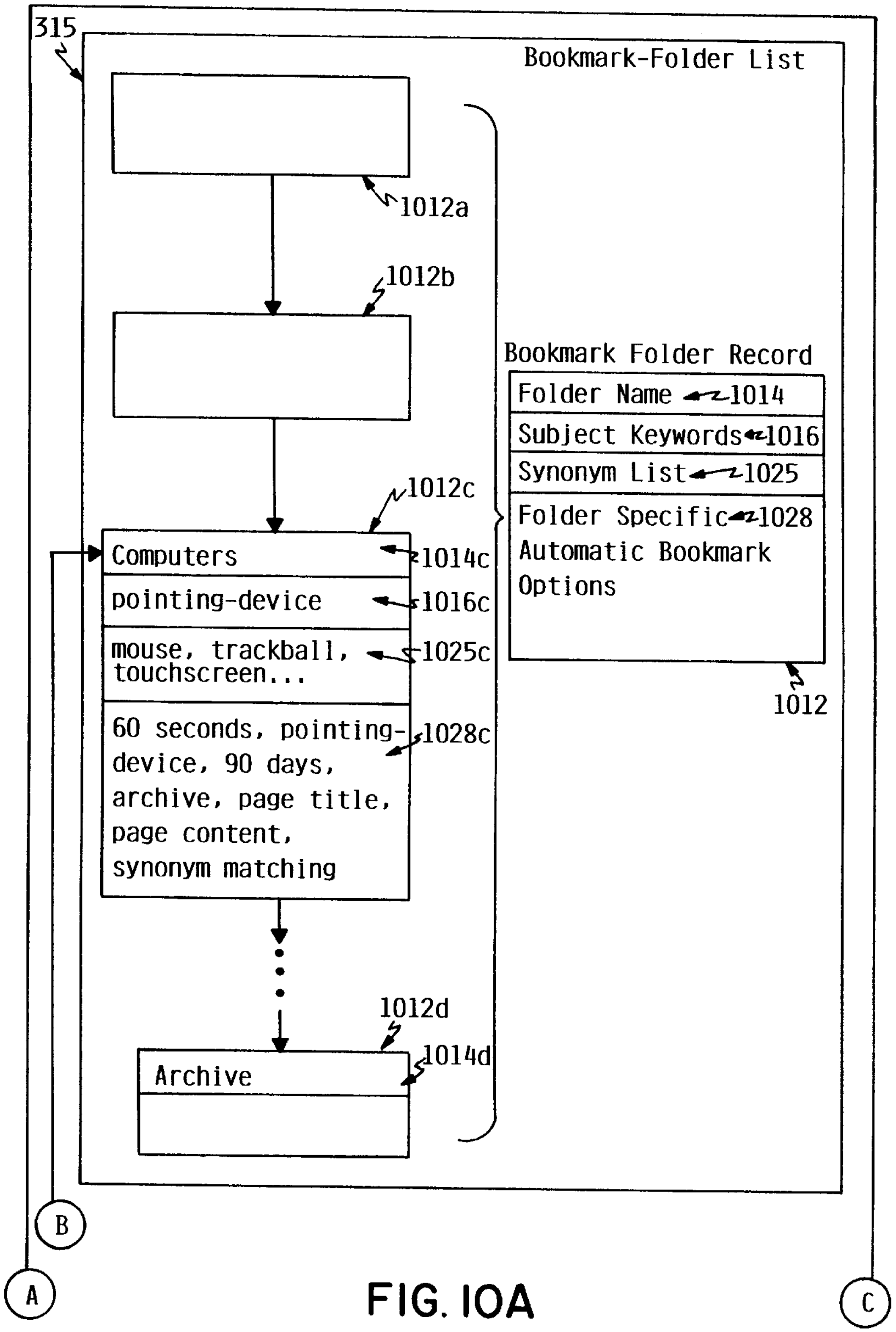
FIG. 10 is a block diagram of the major components of browser 399.
Figure 10B:
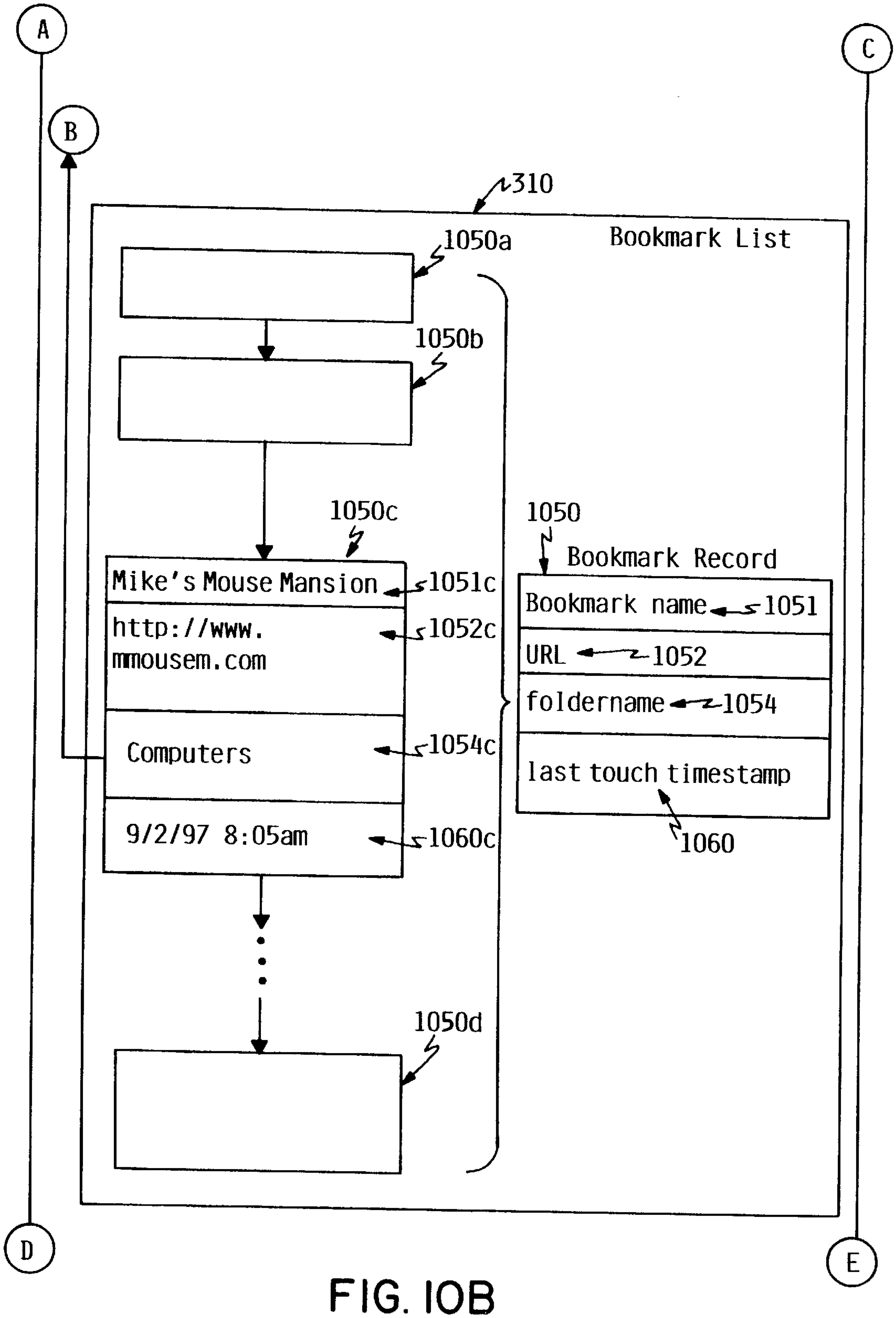
Figure 10C:
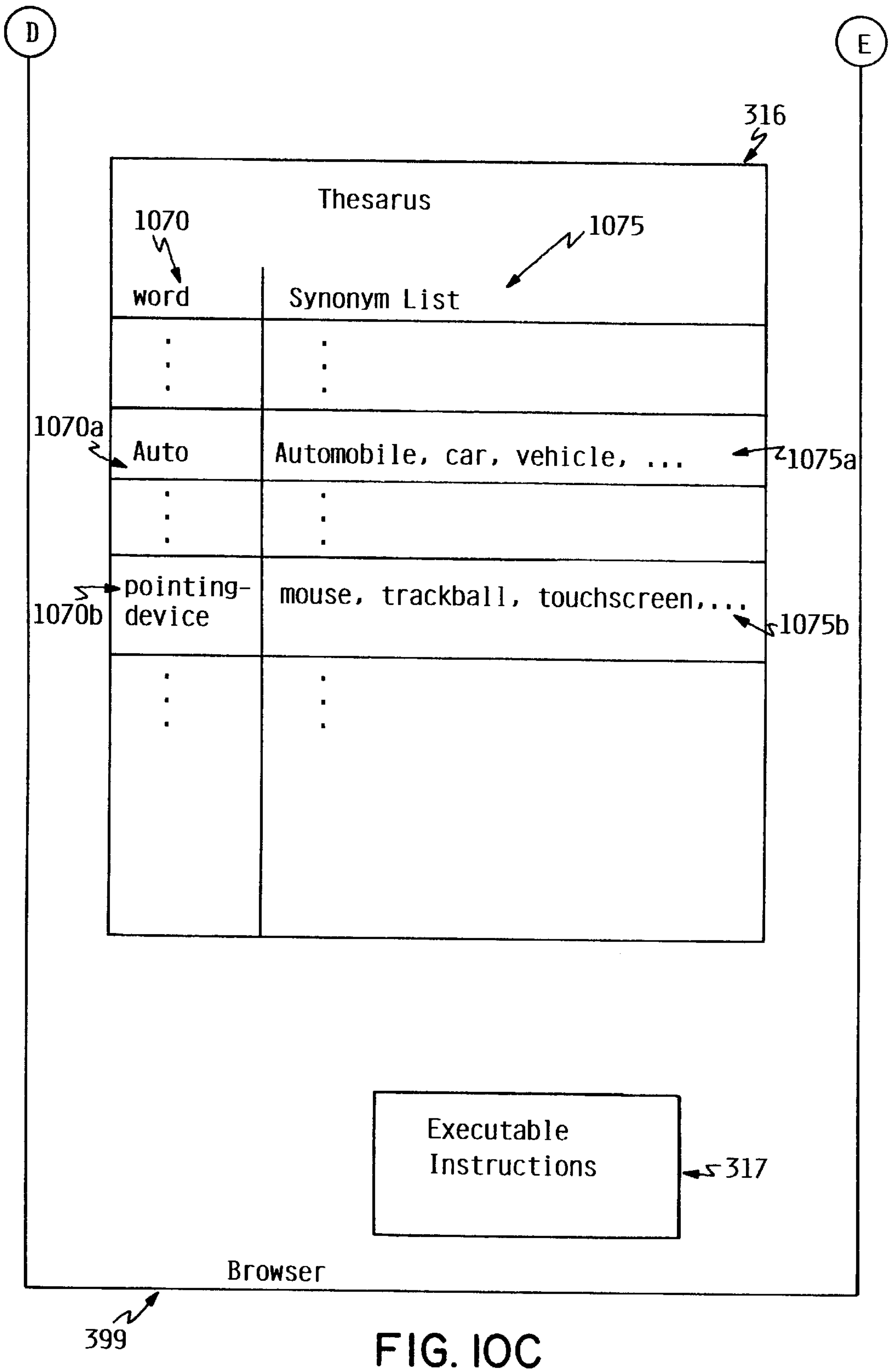

Referring to FIG. 10, there is illustrated a more detailed block-diagram of browser 399. Browser 399 contains bookmark-folder list 315, thesaurus 316, bookmark list 310, and executable instructions 317. Referring again to FIG. 10, bookmark-folder list 315 contains a list of bookmark folder records 1012 shown as example bookmark folders 1012*a*, 1012*b*, 1012*c*, . . . , and 1012*d*. Bookmark-folder records each contain folder-name field 1014, subject keywords 1016, synonym list 1025, and folder-specific automatic-bookmark options 1028.

Bookmark-folder record 1012*c* contains an example of sample values for its fields. Folder name 1014*c* contains "computers". Subject keywords 1016*c* contains "pointing-device". Synonym list 1025*c* contains "mouse, trackball, touchscreen, . . ." Folder-specific automatic bookmark-option 1028*c* contains "60 seconds, pointing-device, 90 days, archive, page title, page content, synonym matching". Thus, bookmark folder record 1012*c* corresponds to computers folder 758 shown in FIG. 7.

Referring again to FIG. 10, folder name 1014*d* contains the contents "archive". Bookmark-folder record 1012*d* corresponds to archive folder 762 in FIG. 7, as is further described under the description for FIG. 11.

Referring again to FIG. 10, bookmark list 310 contains a list of bookmark records 1050 shown as example bookmark records 1050*a*, 1050*b*, 1050*c*, . . . , and 1050*d*. Bookmark records each contain bookmark-name field 1051, URL field 1052, foldername field 1054, and last-touch-timestamp field 1060. Bookmark-name field 1051 contains the name of the bookmark that is displayed in bookmark control 730 in FIG. 7. Referring again to FIG. 10, URL field 1052 contains the address of the web page associated with this bookmark record; for example, in the bookmark record having bookmark-name field 1051 with the value of "PTO Introduction" 752 the URL field 1052 would contain the value "http://www.uspto.gov/web/menu/intro.html" 750, shown in FIG. 7. Referring again to FIG. 10, folder-name field 1054 contains the name of the associated bookmark-folder record 1012. Last-touch timestamp field 1060 contains the date and time that the user last visited the page having the address contained in URL field 1052.

Bookmark record 1050*c* contains an example of sample values for its fields. Bookmark name field 1051*c* contains "Mike's Mouse Mansion", as shown at reference numeral 748 in FIG. 7. Referring again to FIG. 10, URL field 1052*c* contains "http://www.mmousem.com". Folder-name field 1054*c* contains "computers", indicating that bookmark-list record 1050*c* is associated with folder 1012*c*. Last-touch-timestamp field 1060*c* contains "9/2/97 8:05 am".

Thesaurus 316 contains a list of words 1070 and their associated synonym lists 1075. For example, word 1070*a* is "auto" and its associated synonym list 1075*a* is "automobile, car, vehicle, . . .". Word 1070*b* is "pointing-device", and its associated synonym list 1075*b* is "mouse, trackball, touchscreen, . . . ".

Figure 11A:
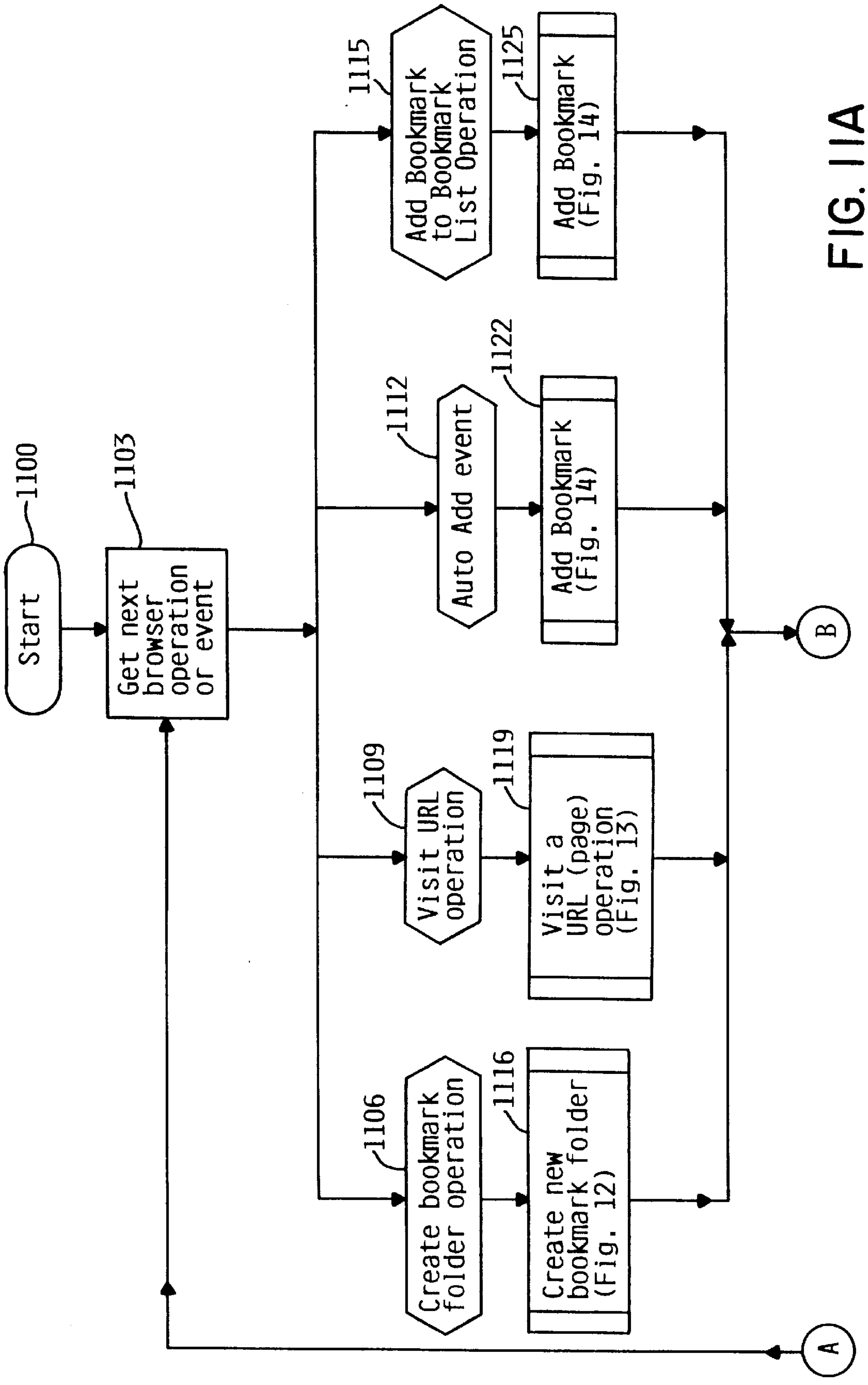
FIGS. 11, 12, 13, and 14 are flow charts that describe the logic of the preferred embodiment.
Figure 11B:
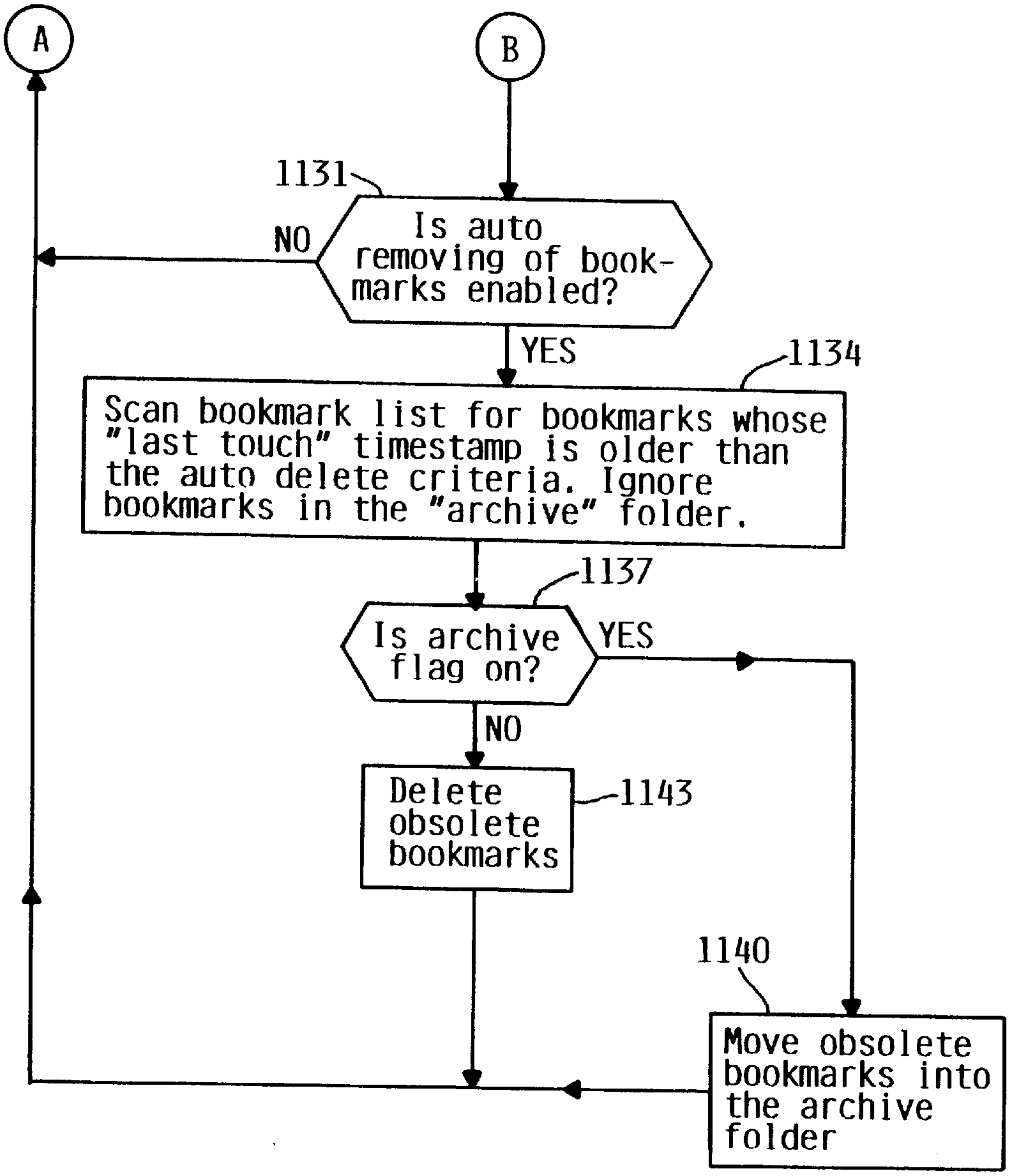

Referring to FIG. 11, there is illustrated the main logic-flow for browser 399. At block 1100, control begins. Control then continues to block 1103 where browser 399 retrieves the next operation requested by the user or the next internal event triggered by browser 399. If the operation or event retrieved at block 1103 is a create-bookmark-folder operation, then control continues to block 1106. If the operation or event at block 1103 is a visit-URL operation, then control continues to block 1109. If the operation or event retrieved at block 1103 is an auto-add event, then control continues to block 1112. If the operation or event retrieved at block 1103 is an add-bookmark-to-bookmark-list operation, then control continues to block 1115.

The creative bookmark folder operation at block 1106 occurs when the user selects option 740 from control menu 730 in FIG. 7. Referring again to FIG. 11, from block 1106, browser 399 continues to block 1116 where it creates a new bookmark folder as further described below under the description for FIG. 12. Control then continues to block 1131, as described below.

A visit URL operation at block 1109 occurs when the user selects a bookmark name from control menu 730 in FIG. 7. Referring again to FIG. 11, from block 1109, control continues to block 1119 where browser 399 performs a visit-URL operation as further described below under the description for FIG. 13. Control then continues to block 1131, as described below.

An auto-add event at block 1112 is triggered internally by browser 399, as described below under the description for FIG. 13. Referring again to FIG. 11, from block 1112, control continues to block 1122 where browser 399 performs an add-bookmark operation as further described below under the description for FIG. 14. Control then continues to block 1131 as described below.

An add-bookmark to bookmark-list operation at block 1115 occurs when the user selects add-bookmark option 732 in FIG. 7. Referring again to FIG. 11, film block 1115, control continues to block 1125 where browser 399 performs an add-bookmark operation as further described below under the description for FIG. 14. Control then continues to block 1131 as described below.

At block 1131, browser 399 determines whether the user has previously selected auto removing of bookmarks as previously described at reference numeral 920 in FIG. 9*b*. Referring again to FIG. 11, if the determination at block 1131 is false, then control returns to block 1103, as described above. If the determination at block 1131 is true, then control continues to block 1134 where browser 399 scans bookmark list 310 searching for bookmarks whose "last-touch" timestamp is older than the auto-remove criteria specified by the user at reference numeral 925, as described above in FIG. 9*b*. Referring again to FIG. 11, the logic at block 1134 ignores the bookmarks in the archive folder. The archive folder is a folder in bookmark-folder list 315 that has a folder name 1014 with a value of "archive", in the preferred embodiment and is shown in FIG. 10 as bookmark-folder record 1012*d*.

Referring again to FIG. 11, control then continues to block 1137 where browser 399 determines whether the user has selected archiving. The user is provided the opportunity to select archiving at reference numeral 930 in FIG. 9*b*. Referring again to Fig. I1, if the determination at block 1137 is true, then browser 399 continues to block 1140 where it moves obsolete bookmarks into the archive folder. Bookmarks are determined obsolete using the selection criteria specified by the user in reference numeral 925, as previously described under the description for FIG. 9*b*. Referring again to FIG. 11, browser 399 moves obsolete bookmarks into the archive folder by changing folder-name field 1054 in the appropriate bookmark-list record in bookmark list 310 to contain the name of archive folder 1012*d*. Control then returns to block 1103, as described above. If the determination at block 1137 is false, then browser 399 continues to block 1143 where browser 399 deletes obsolete bookmarks in bookmark list 310. Obsolescence is determined by the criteria specified by the user in reference numeral 925 in FIG. 9. Referring again to FIG. 11, control then returns to block 1103 where processing continues as described above.

Figure 12:
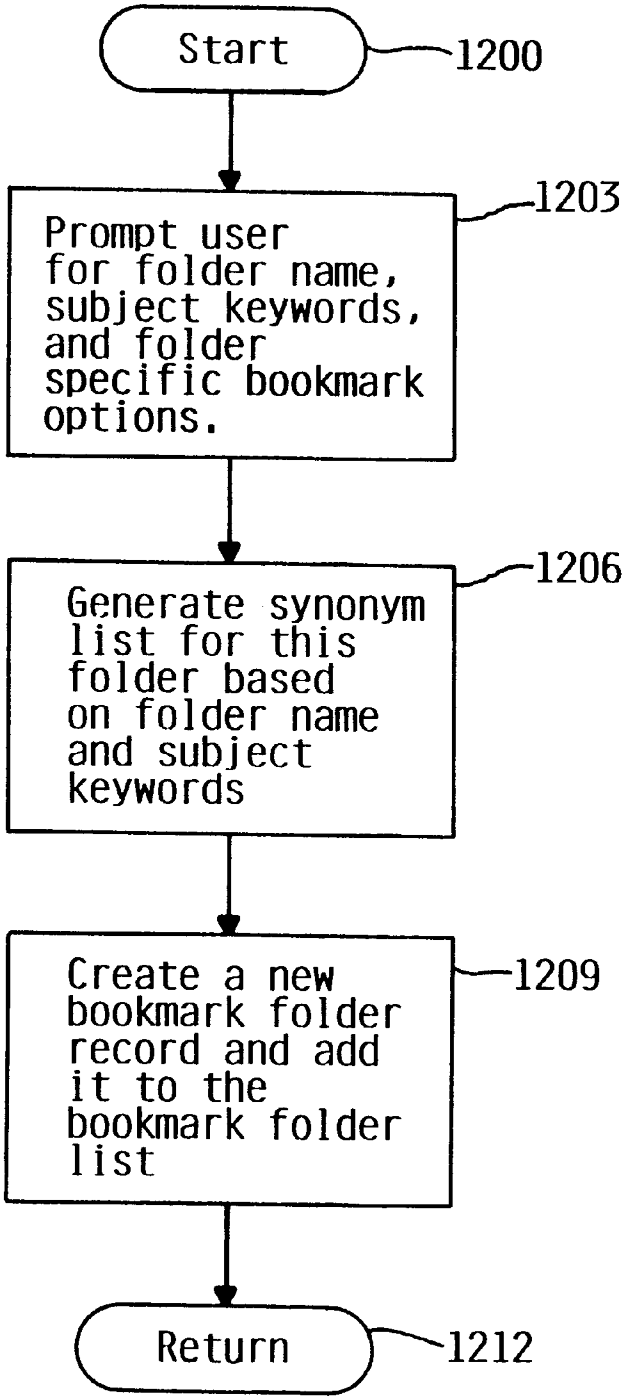

Referring to FIG. 12, there is illustrated example logic that creates a new bookmark folder. Control starts at block 1200. Control then continues block 1203 where browser 399 prompts the user for folder name 805 and subject keywords 810 as shown above in FIG. 8. If the user has selected change button 815 in FIG. 8, then browser 399 at block 1203 also prompts the user for folder-specific automatic-bookmark options 900, as shown in FIG. 9. Referring again to FIG. 12, control then continues to block 1206 where browser 399 generates synonym list 1025 using folder name 805 and subject keywords 810 as indexes into thesaurus 316. Control then continues to block 1209 where browser 399 creates new bookmark-folder record 1012 and adds it to bookmark-folder list 315 with the values collected from the user, as shown above under the description for FIG. 8. Folder name 805 is stored in folder name 1014, and subject keywords 810 are stored in subject keywords 1016. Referring again to FIG. 12, browser 399 also enters the data that the user entered in folder-specific automatic-bookmark options screen 915 into bookmark-folder record 1012 in field 1028. Control then continues to block 1212 where the function of browser 399 returns.

Figure 13A:
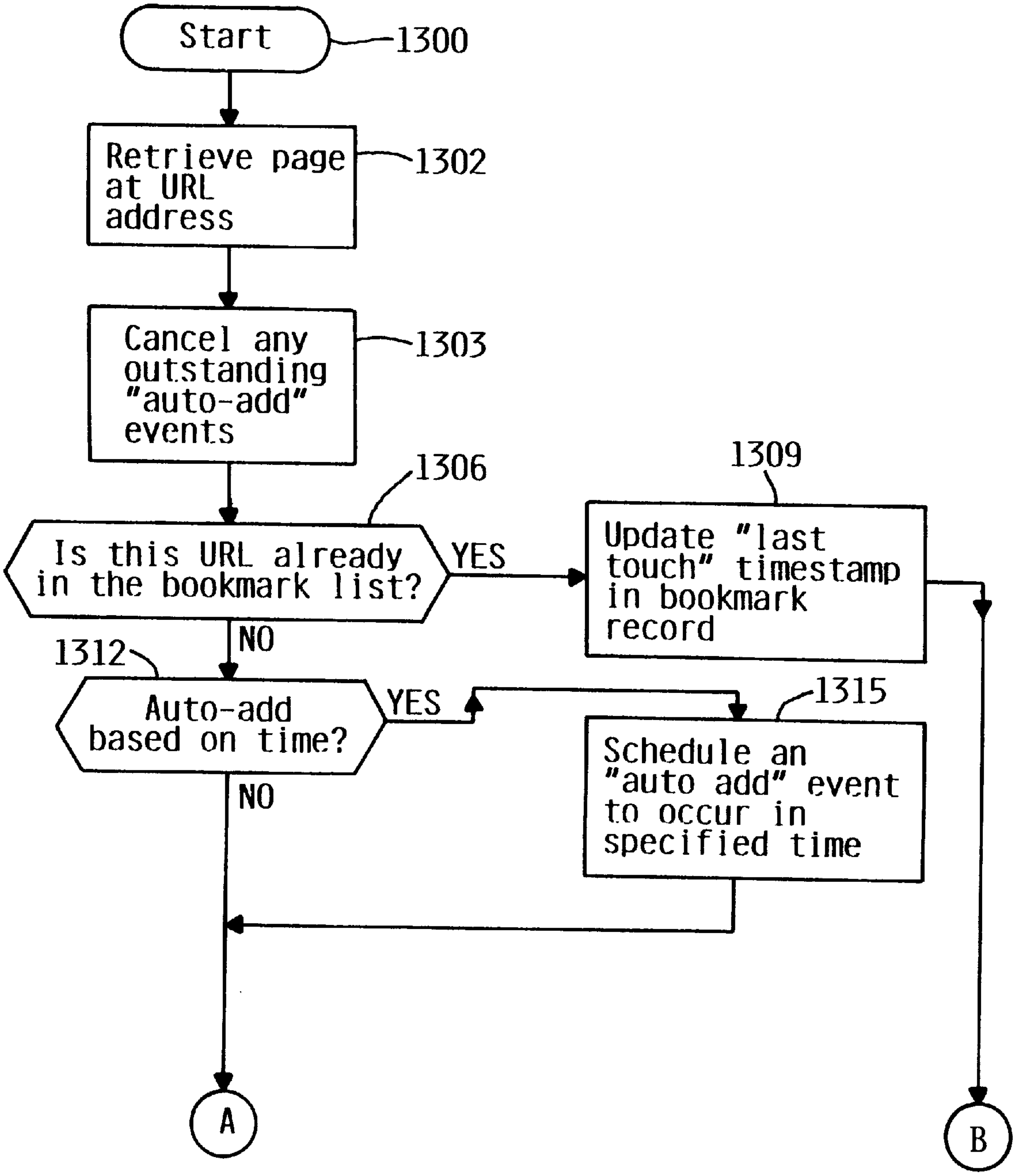
Figure 13B:
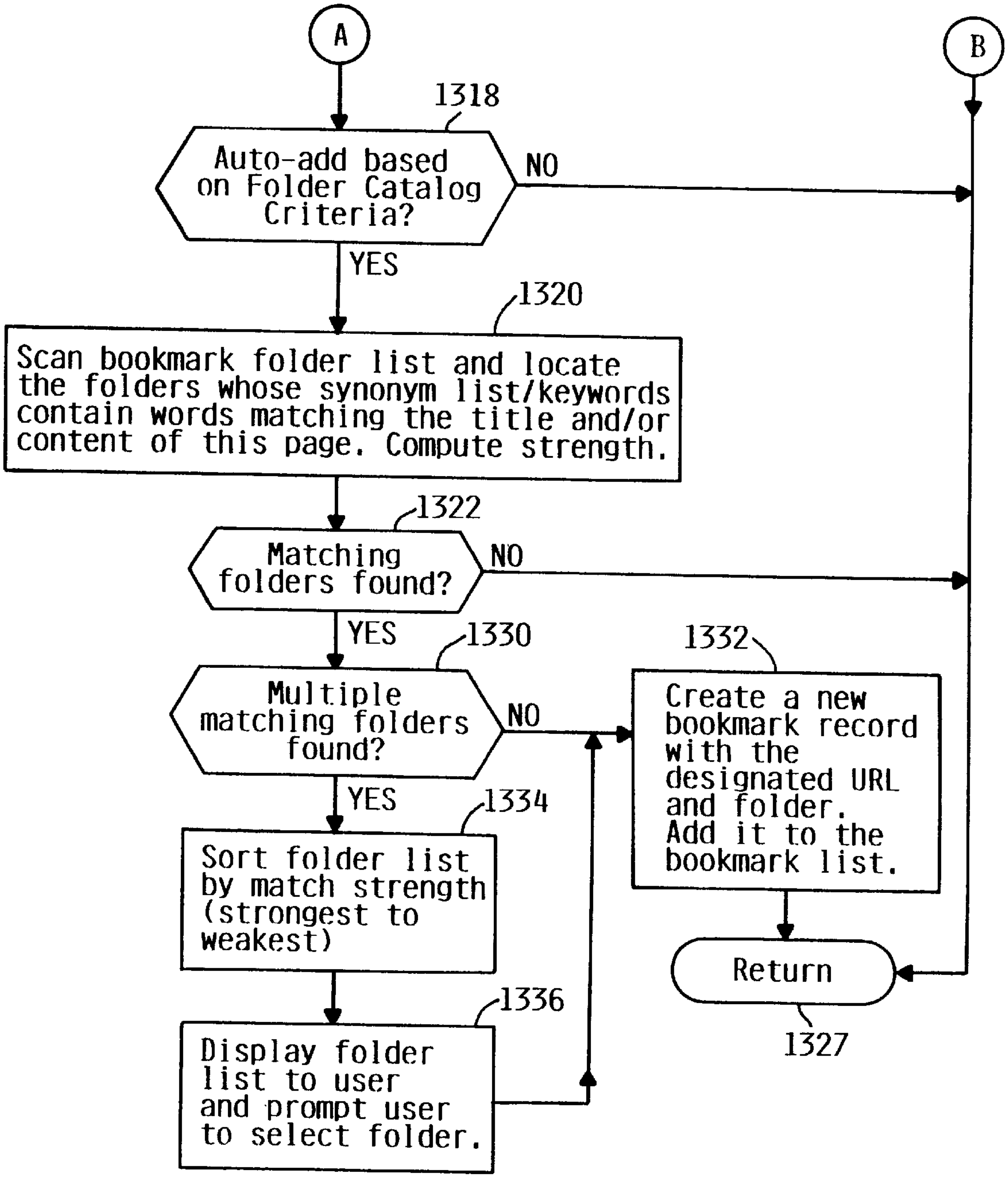

Referring to FIG. 13, there is illustrated sample logic that adds a bookmark entry to bookmark list 310. At block 1300 control begins. Control then continues to block 1302 where browser 399 retrieves the web page at the user-specified URL address. Control then continues to block 1303 where browser 399 cancels any outstanding auto-add events. Control then continues block 1306 where browser 399 determines whether the user-specified URL is already present in bookmark list 310. If the determination at block 1306 is true, then control continues to block 1309 where browser 399 updates last-touch timestamp 1060 in bookmark record 1050 to reflect the time that the page associated with this URL was retrieved. Control then continues to block 1327 where the function returns.

If the determination at block 1306 is false, then browser 399 continues to block 1312 where browser 399 determines whether the user has requested auto adding of bookmarks to any folder based on time, which can be done at reference numeral 910 in FIG. 9*a*. Referring again to FIG. 13, if the determination at block 1312 is true, then browser 399 continues to block 1315 where browser 399 schedules an auto-add event to occur for the selected folder in the time requested by the user at reference numeral 910 in FIG. 9*a*. Browser 399 will detect this auto-add event at block 1112 as previously described under the description for FIG. 11. Referring again to FIG. 13, control then continues to block 1318, as described below.

If the determination at block 1312 is false, then browser 399 continues to block 1318 where it determines whether the user has selected auto-adding of bookmarks based on folder catalog-criteria, as described above under the description for reference numeral 911 in FIG. 9*a*. Referring again to FIG. 13, if the determination at block 1318 is true, then browser 399 continues to block 1320 where browser 399 scans bookmark-folder list 315 and locates all folders with auto-cataloging enabled that meet the selection criteria specified by the user at reference numerals 945, 950, and 955 in FIG. 9*b*. Referring again to FIG. 13, for example, if the user has selected match-page-title 945, match-page-content 950, and synonym matching 955, then browser 399 will locate all folders with auto-cataloging that have a synonym list 1025 containing words that match the title or content of the retrieved page. If the user selected match-page-title 945 and match-page-content 950, but not synonym matching 955, then browser 399 will locate all folders with auto-cataloging that have a subject keywords 1016 containing words that match the title or content of the retrieved page.

Browser 399 then computes a match strength for each folder that has matches. The match strength could be calculated by a variety of algorithms; for example by counting the number of words in the page that match the keyword or are contained in the synonym list. Matching words in the title, abstract, or in hot spots could be weighted more heavily than words within the body of the page. Control then continues to block 1322 where browser 399 determines if matching folders were found at block 1320. If the determination at block 1322 is false, then browser 399 continues to block 1327 where the function returns.

If the determination at block 1322 is true, then browser 399 continues to block 1330, where browser 399 determines if multiple matching folders were found at block 1320. If the determination at block 1330 is true, then browser 399 continues to block 1334 where browser 399 soils the folder list by the match-strength previously determined at block 1320. Control then continues to block 1336, where browser 399 displays the sorted folder list film strongest match-strength to weakest match-strength and prompts the user to select a folder from the displayed list. Alternatively, browser 399 could select the folder with the strongest match-strength. Control then continues to block 1332 where browser 399 creates a new bookmark record 1050 in bookmark list 310 with the designated URL and the folder selected in block 1336. Control then continues to block 1327 where the function returns.

If the determination at block 1330 is false, then browser 399 continues to block 1332 where it creates a new bookmark record 1050 in bookmark list 310 with the URL found in block 1320, as described above. Control then continues to block 1327 where the function returns.

If the determination at block 1318 is false, then the function continues directly to block 1327 where it returns.

Figure 14:
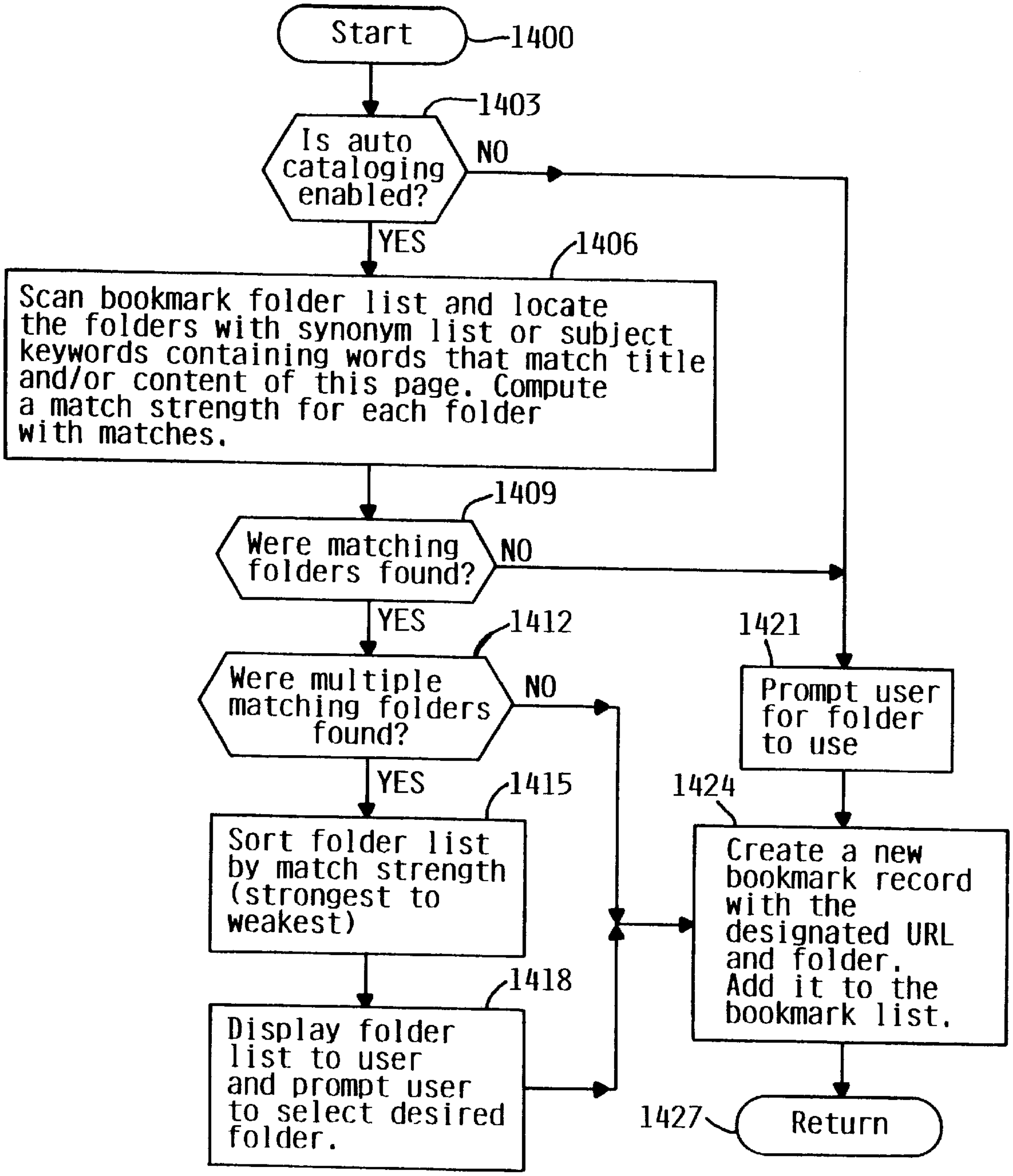

Referring to FIG. 14, there is illustrated sample logic for the add bookmark function, which is invoked from blocks 1122 and 1125 in FIG. 11. Referring again to FIG. 14, at block 1400 control starts. Control then continues to block 1403 where browser 399 determines whether the user has previously selected auto cataloging for any folder, as previously described under the description for FIG. 9*b* at reference numeral 940. Referring again to FIG. 14, if the determination at block 1403 is false, then control continues to block 1421 where browser 399 prompts the user to input the name of the folder in bookmark-folder list 315 to be used. Control then continues to block 1424 where browser 399 creates a new bookmark record 1050 in bookmark list 310 with the folder name that the user specified in block 1421 and with the URL associated with the retrieved page. Control then continues to block 1427 where the function returns.

If the determination at block 1403 is true, then control continues to block 1406 where browser 399 scans bookmark-folder list 315 and locates all folders with auto cataloging enabled that meet the selection criteria specified by the user at reference numerals 945, 950, and 955 in FIG. 9*b*. Referring again to FIG. 14, for example, if the user has selected match-page-title 945, match-page-content 950, and synonym matching 955, then browser 399 will locate all folders with auto-cataloging that have a synonym list 1025 containing words that match the title or content of the retrieved page. If the user selected match-page-title 945 and match-page-content 950, but not synonym matching 955, then browser 399 will locate all folders with auto-cataloging that have a subject keywords 1016 containing words that match the title or content of the retrieved page. Browser 399 then computes a match strength for each folder that has matches. The match strength could be calculated by a variety of algorithms; for example by counting the number of words in the page that match the keyword or are contained in the synonym list. Matching words in the title, abstract, or in hot spots could be weighted more heavily than words within the body of the page. Control then continues to block 1409 where browser 399 determines if matching folders were found. If the determination at block 1409 is false, then browser 399 continues to block 1421, as previously described above.

If the determination at block 1409 is true, then browser 399 continues to block 1412 where it determines whether multiple matching folders were found by the scan operation of block 1406. If the determination at block 1412 is false, then browser 399 continues to block 1424 where it creates a new bookmark record 1050 in bookmark list 310 with the URL found in block 1406, as described above. Control then continues to block 1427 where the function returns.

If the determination at block 1412 is true, then browser 399 continues to block 1415 where it sorts the folder list by the match-strength previously determined at block 1406. Control then continues to block 1418 where browser 399 displays the sorted folder list from strongest match-strength to weakest match-strength and prompts the user to select the desired folder. Alternatively, browser 399 could select the folder with the strongest match-strength. Control then continues to block 1424 where browser 399 creates a new bookmark record 1050 in bookmark list 310 with the designated URL and the folder selected in block 1418. Control then continues to block 1427 where the function returns.

While this invention has been described with respect to the preferred and alternative embodiments, it will be understood by those skilled in the art that various changes in detail may be made therein without departing from the spirit, scope, and teaching of the invention. For example, browsers may become widely employed in consumer applications such as operator panels for consumer electronics and appliances. Accordingly, the herein disclosed invention is to be limited only as specified in the following claims.

What is claimed is:

1. An apparatus that automatically generates bookmarks, comprising:

a processor;

memory coupled to the processor;

a bookmark list, residing in the memory, wherein the bookmark list comprises a list of names and addresses of pages; and a browser, residing in the memory and executed by the processor, wherein when a page is viewed the browser automatically determines whether to add an entry for the viewed page to the bookmark list based on a selection criteria, and when the determination is true, the browser adds the entry for the viewed page to the bookmark list, and wherein the selection criteria is based on a duration of time that a user browses the viewed page using the browser.

2. The apparatus of claim 1, wherein the selection criteria comprises the browser matching a keyword to a word in the viewed page.

3. The apparatus of claim 1, wherein the selection criteria comprises the browser creating a synonym list from a keyword and a thesaurus and matching a word in the viewed page to a portion of the synonym list.

4. The apparatus of claim 1, further comprising:

a bookmark-folder list, residing in the memory, comprising a plurality of bookmark folders, wherein the browser automatically catalogs the entry into the bookmark-folder list based on a cataloging criteria.

5. The apparatus of claim 4, wherein each of the plurality of bookmark folders contains a keyword field, and the cataloging criteria comprises the browser matching a word in the viewed page to the contents of the keyword field.

6. The apparatus of claim 4, wherein each of the plurality of bookmark folders contains a keyword field and a synonym-list field, wherein the browser determines the contents of the synonym-list field using the keyword field and a thesaurus, and wherein the cataloging criteria comprises the browser matching a word in the viewed page to a portion of the synonym-list field.

7. The apparatus of claim 5, wherein when the browser finds multiple bookmark folders that match the word in the viewed page, the browser further calculates a match strength and uses the match strength to determine in which folder to catalog the entry.

8. The apparatus of claim 1, wherein the browser further automatically removes the entry from the bookmark list when the viewed page is not subsequently visited within a pre-determined time.

9. The apparatus of claim 8, wherein removing the entry further comprises the browser deleting the entry from the bookmark list.

10. The apparatus of claim 8, wherein removing the entry further comprises the browser moving the entry to an archive folder.

11. A program product that automatically generates bookmarks, comprising:

a browser that when a page is viewed automatically determines whether to add an entry for the viewed page to a bookmark list based on a selection criteria, and when the determination is true, the browser adds the entry for the viewed page to the bookmark list, wherein the bookmark list comprises a list of names and address of pages, and wherein the selection criteria is based on a duration of time that a user browses the viewed page using the browser; and signal-bearing media bearing the browser.

12. The program product of claim 11, wherein the selection criteria comprises the browser matching a keyword to a word in the viewed page.

13. The program product of claim 11, wherein the selection criteria comprises the browser creating a synonym list from a keyword and a thesaurus and matching a word in the viewed page to a portion of the synonym list.

14. The program product of claim 11, wherein the browser automatically catalogs the entry into a bookmark-folder list based on a cataloging criteria, wherein the bookmark-folder list comprises a plurality of bookmark folders.

15. The program product of claim 14, wherein each of the plurality of bookmark folders contains a keyword field, and the cataloging criteria comprises the browser matching a word in the viewed page to the contents of the keyword field.

16. The program product of claim 14, wherein each of the plurality of bookmark folders contains a keyword field and a synonym-list field, wherein the browser determines the contents of the synonym-list field using the keyword field and a thesaurus, and wherein the cataloging criteria comprises the browser matching a word in the viewed page to a portion of the synonym-list field.

17. The program product of claim 15, wherein when the browser finds multiple bookmark folders that match the word in the viewed page, the browser further calculates a match strength and uses the match strength to determine in which folder to catalog the entry.

18. The program product of claim 11, wherein the browser further automatically removes the entry from the bookmark list when the viewed page is not subsequently visited within a pre-determined time.

19. The program product of claim 18, wherein removing the entry further comprises the browser deleting the entry from the bookmark list.

20. The program product of claim 18, wherein removing the entry further comprises the browser moving the entry to an archive folder.

21. A method that automatically generates bookmarks, comprising the computer-executed steps of:

browsing a page;

when the page is browsed, automatically determining whether to add an entry for the browsed page to a bookmark list based on a selection criteria, wherein the bookmark list comprises a fist of names and addresses of pages, and wherein the selection criteria is based on a duration of time that a user views the page; and when the determination is true, automatically adding the entry for the browsed page to the bookmark list.

22. The method of claim 21, wherein the selection criteria comprises matching a keyword to a word in the viewed page.

23. The method of claim 21, wherein the selection criteria comprises creating a synonym list from a keyword and a thesaurus and matching a word in the viewed page to a portion of the synonym list.

24. The method of claim 21, further comprising:

automatically cataloging the entry into a bookmark-folder list based on a cataloging criteria, wherein the bookmark-folder list comprises a plurality of bookmark folders.

25. The method of claim 24, wherein each of the plurality of bookmark folders contains a keyword field, and the cataloging criteria comprises matching a word in the viewed page to the contents of the keyword field.

26. The method of claim 24, wherein each of the plurality of bookmark folders contains a keyword field and a synonym-list field, wherein the contents of the synonym-list field are determined using the keyword field and a thesaurus, and wherein the cataloging criteria comprises matching a word in the viewed page to a portion of the synonym-list field.

27. The method of claim 25, further comprising:

calculating a match strength of all bookmark folders found in the matching step when multiple bookmark folders are found that match the word in the viewed page; and determining in which folder to catalog the entry by using the match strength.

28. The method of claim 21, further comprising:

removing the entry film the bookmark list when the viewed page is not subsequently visited within a predetermined time.

29. The method of claim 28, wherein the removing step further comprises deleting the entry from the bookmark list.

30. The method of claim 28, wherein the removing step further comprises moving the entry to an archive folder.

* * * * *

UNITED STATES PATENT AND TRADEMARK OFFICE
CERTIFICATE OF CORRECTION

PATENT NO. : 6,100,890
DATED : August 8, 2000
INVENTOR(S) : Cary Lee Bates and Jeffrey Michael Ryan It is certified that error appears in the above-identified patent and that said Letters Patent is hereby corrected as shown below:

Claim 21, Column 16,
Line 44 "fist" should be -- list --.

Claim 28, Column 18,
Line 2 "film" should be -- from --.

Signed and Sealed this

Twenty-first Day of August, 2001

Attest:

Nicholas P. Godici

NICHOLAS P. GODICI

*Attesting Officer* *Acting Director of the United States Patent and Trademark Office*